US008013735B2

(12) United States Patent
Arpin et al.

(10) Patent No.: US 8,013,735 B2
(45) Date of Patent: Sep. 6, 2011

(54) ASSET RECOVERY SYSTEM

(75) Inventors: Claude Arpin, Longueuil (CA); William R. Duvall, Sudbury, MA (US); Joseph T. Lipowski, Scituate, MA (US); Arvind K. Ramadorai, Arlington, MA (US); Thomas A. Wooters, Boston, MA (US)

(73) Assignee: LoJack Operating Company, LP, Westwood, MA (US)

( * ) Notice: Subject to any disclaimer, the term of this patent is extended or adjusted under 35 U.S.C. 154(b) by 420 days.

(21) Appl. No.: 12/378,242

(22) Filed: Feb. 12, 2009

(65) Prior Publication Data

US 2009/0207050 A1 Aug. 20, 2009

Related U.S. Application Data

(60) Provisional application No. 61/065,799, filed on Feb. 14, 2008.

(51) Int. Cl.
*G08B 1/08* (2006.01)
*B60R 25/10* (2006.01)
*H04M 11/04* (2006.01)
*G01S 19/10* (2010.01)

(52) U.S. Cl. ........... 340/539.13; 340/426.19; 455/404.2; 455/456.1; 342/357.47

(58) Field of Classification Search .............. 340/539.13
See application file for complete search history.

(56) References Cited

U.S. PATENT DOCUMENTS

| | | | | |
|---|---|---|---|---|
| 5,504,474 | A | 4/1996 | Libman et al. | |
| 5,731,757 | A | 3/1998 | Layson, Jr. | |
| 5,831,535 | A | 11/1998 | Reisman et al. | |
| 5,936,529 | A | 8/1999 | Reisman et al. | |
| 5,959,533 | A | 9/1999 | Layson, Jr. et al. | |
| 5,982,281 | A | 11/1999 | Layson, Jr. | |
| 6,014,080 | A | 1/2000 | Layson, Jr. | |
| 6,462,664 | B1 | 10/2002 | Cuijpers et al. | |
| 6,553,256 | B1 | 4/2003 | Jorgenson et al. | |
| 6,721,688 | B1 | 4/2004 | Clarke | |
| 6,774,799 | B2 | 8/2004 | Defant et al. | |
| 7,049,942 | B2 | 5/2006 | Gallovich | |
| 7,053,831 | B2 | 5/2006 | Dempsey et al. | |
| 7,099,895 | B2 | 8/2006 | Dempsey | |
| 7,119,695 | B2 | 10/2006 | Defant et al. | |
| 7,135,967 | B2 * | 11/2006 | Culpepper et al. | 340/539.21 |
| 7,205,890 | B2 | 4/2007 | Defant et al. | |
| 7,327,258 | B2 | 2/2008 | Fast et al. | |
| 7,330,122 | B2 | 2/2008 | Derrick et al. | |

(Continued)

OTHER PUBLICATIONS

Remote MDx-Safety and Security through Tracking and Monitoring Solutions, http://www.remotemdx.com/Default.aspx printed Oct. 24, 2008 (two (2) pages).

(Continued)

*Primary Examiner* — Donnie Crosland
(74) *Attorney, Agent, or Firm* — Iandiorio Teska & Coleman

(57) ABSTRACT

An asset location, tracking, and recovery system and method includes a network of VHF towers and a control center receiving signals from and transmitting signals to the VHF towers. Primary locating units each include a transmitter, a receiver, and a transponder activated when a signal is transmitted by the control center via the VHF towers to the receiver. Auxiliary locating units include at least a transmitter emitting a signal received by at least one primary locating unit receiver which relays that signal to the control center via the VHF towers from the primary locating unit transmitter.

29 Claims, 2 Drawing Sheets

U.S. PATENT DOCUMENTS

| | | | |
|---|---|---|---|
| D578,918 S | 10/2008 | Aninye | |
| 2003/0174059 A1 | 9/2003 | Reeves | |
| 2005/0020279 A1 | 1/2005 | Markhovsky et al. | |
| 2005/0140508 A1 | 6/2005 | Tessier et al. | |
| 2005/0148303 A1 | 7/2005 | Dempsey | |
| 2006/0007039 A1 | 1/2006 | Duvall | |
| 2006/0025900 A1 | 2/2006 | Arnouse | |
| 2006/0238350 A1 | 10/2006 | Tessier | |
| 2006/0277202 A1 | 12/2006 | Dempsey | |
| 2006/0294563 A1 | 12/2006 | Guillorit | |
| 2006/0294564 A1 | 12/2006 | Guillorit | |
| 2007/0046258 A1 | 3/2007 | Defant et al. | |
| 2008/0012760 A1 | 1/2008 | Derrick et al. | |
| 2008/0012761 A1 | 1/2008 | Derrick et al. | |
| 2008/0018458 A1 | 1/2008 | Derrick et al. | |
| 2008/0018459 A1 | 1/2008 | Derrick et al. | |
| 2008/0088437 A1 | 4/2008 | Aninye et al. | |
| 2008/0088438 A1 | 4/2008 | Aninye et al. | |
| 2008/0194925 A1 | 8/2008 | Alsafadi et al. | |
| 2008/0201076 A1 | 8/2008 | Huang et al. | |
| 2008/0218358 A1 | 9/2008 | Derrick et al. | |
| 2008/0246656 A1* | 10/2008 | Ghazarian | 342/357.07 |

OTHER PUBLICATIONS

Omnilink, http://www.omnilink.com/ printed Oct. 24, 2008 (two (2) pages).

Telehealth Solutions, http://www.medical.philips.com/goto/telemonitoring, printed Oct. 23, 2008 (one (1) page).

Lifeline Sys, http://philips.lifelinesys.com/extended_home_2/?campaign=113&gclid=CPvlytWLvpYCFSCysgodNS7, printed Oct. 23, 2008 (one (1) page).

Lifeline Sys, http://philips.lifelinesys.com/extended_how_works_2/?campaign=113, printed Oct. 23, 2008 (one (1) page).

Dmatek Markets & Subsidiaries, http://www/dmatek.com/default.asp?PagelD=9, printed Feb. 24, 2009 (one (1) page).

Zoombak Personal GPS Locators / Portable GPS Tracker / Vehicle Tracking / Family Car Monitoring, http://www.zoombak.com, printed Oct. 24, 2008 (three (3) pages).

Written Opinion of the International Searching Authority for PCT Application No. PCT/US2009/000877 mailed Apr. 9, 2009 (eight (8) pages).

* cited by examiner

ASSET RECOVERY SYSTEM

RELATED APPLICATIONS

This application hereby claims the benefit of and priority to U.S. Provisional Application Ser. No. 61/065,799, filed on Feb. 14, 2008 under 35 U.S.C. §§119, 120, 363, 365, and 37 C.F.R. §1.55 and §1.78, which is hereby incorporated herein by reference.

FIELD OF THE INVENTION

This subject invention relates to location, tracking and recovery systems and methods.

BACKGROUND OF THE INVENTION

The applicant's successful LoJack® system includes a vehicle locating unit with a receiver and a transponder installed in a hidden location within a customer's vehicle. When the customer reports to the police that the vehicle has been stolen, that information is forwarded to a LoJack® control center whose databases ascertain that the vehicle includes a vehicle locating unit. The control center forwards a signal via a proprietary VHF tower network which is received by the receiver of the vehicle locating unit in the customer's vehicle. Upon receipt of this signal, the vehicle locating unit transponder is activated and its signal can be detected by a vehicle tracking unit installed in a police vehicle so that the police can thus track and locate the stolen vehicle. See U.S. Pat. Nos. 4,177,466 and 4,818,998 incorporated herein by this reference.

Since the advent of the LoJack® system, certain modifications and enhancements thereto have been invented. U.S. Pat. No. 5,917,423, for example, details ways to manually activate a vehicle locating unit transponder and also includes an automatic activation feature for the vehicle locating unit transponder when tampering with the vehicle is detected. U.S. patent application Ser. No. 10/150,818 discloses the use of a cellular network which can be used as an alternate communication channel to activate the vehicle locating unit transponder. See also U.S. Pat. Nos. 5,895,436; 6,229,988; 6,522,698; 6,665,613; 6,876,858; 6,847,825; and 7,091,835 all incorporated herein by this reference. See also co-pending application Ser. Nos. 10/241,259; 10/441,569; 10/886,870; 11/131,847; 11/131,948; 11/131,846; 11/229,736; 11/207,033; 11/502,191; 11/509,287; and 11/716,793, also incorporated herein by this reference.

Other vehicle recovery systems are also known. For example, UNI Tracking VTU Industries, Inc. offers a vehicle tracking unit with a GPS subsystem. Vehicle position data is forwarded to the customer's computer via a cellular network. One problem with systems that rely entirely on the Global Positioning System for tracking is that Global Positioning System signals are not available indoors or in so-called urban canyons. Still other vehicle tracking or locating systems determine the vehicle's location by cell tower triangulation techniques. One problem with such systems is the need for an expensive cell phone account. Hybrid systems are also available or have been proposed. Most of these systems suffer from the problems noted above and/or are expensive, complex, or unreliable. Moreover, non-LoJack® systems do not directly involve police intervention for theft reporting and tracking.

It has also been proposed to use RFID technology to track vehicles and objects. One problem with RFID technology is that it is fairly expensive to deploy. Numerous dedicated readers are required in close proximity to the RFID "tag" in order for it to be detected.

BRIEF SUMMARY OF THE INVENTION

It is therefore an object of this invention to provide enhancements to the applicant's successful LoJack® system.

It is a further object of this invention to provide such enhancements that can be used apart from the applicant's LoJack® system.

It is a further object of this invention to provide such enhancements which are relatively easy to implement.

It is a further object of this invention to provide such enhancements at a fairly low cost to the consumer.

It is a further object of this invention to provide various enhancements to the applicant's LoJack® system which are reliable.

It is a further object of this invention to provide such enhancements that are less complex.

The subject invention results from the realization that the LoJack® vehicle locating units and the VHF tower network can be used in conjunction with lower cost auxiliary locating units including only a transmitter (or, in one embodiment, a transceiver) to locate, track, and recover vehicles and other objects of value.

The subject invention, however, in other embodiments, need not achieve all these objectives and the claims hereof should not be limited to structures or methods capable of achieving these objectives.

The subject invention features an asset location, tracking, and recovery system comprising a network of VHF towers, a control center receiving signals from and transmitting signals to the VHF towers, and a locating unit including a transmitter, a receiver, and a transponder activated when a signal is transmitted by the control center via the VHF towers to the receiver. Auxiliary locating units include at least a transmitter emitting a signal received by the locating unit receiver and relayed to the control center via the VHF towers from the locating unit transmitter.

The locating unit may further include a position determination subsystem for transmitting, from the locating unit transmitter, the position of the vehicle locating unit to the control center via the VHF towers. One position determination subsystem may include a global positioning system unit. Typically, the control center includes a database of auxiliary locating units reported stolen, missing, lost, or in need of finding. This information is downloaded to the locating unit which is configured to relay a received auxiliary locating unit signal to the control center only if that signal matches an auxiliary locating unit stored in the database.

The vehicle locating unit may further include a cellular transceiver operable to activate the transponder based on a signal received from a cellular network. The locating unit is then further configured to relay to the control center, via the cellular transceiver and the cellular network, a signal emitted by an auxiliary locating unit.

In one example, an auxiliary locating unit and a locating unit are installed in one vehicle. The locating unit may be configured to transmit a message to the control center when the auxiliary locating unit fails to emit a signal. The auxiliary locating units may also include a receiver. The locating unit then transmits a signal to the auxiliary locating unit receiver and the auxiliary locating unit is configured to emit a signal if the locating unit fails to transmit its signal.

In another example, an auxiliary locating unit is installed in a first vehicle and a vehicle locating unit is installed in a different, second vehicle. Such an auxiliary locating unit may further include a receiver for receiving signals from the locating unit transmitter and/or from the control center via the VHF tower network. The auxiliary locating unit may further include a receiver and is configured to emit a signal only when a signal is received by the receiver. The control center is typically configured to query the vehicle locating unit regarding whether it has received an auxiliary locating unit signal.

The subject invention also features an asset recovery system comprising a communications network, a control center receiving signals from and transmitting signals to the communications network, a primary locating unit including a transmitter, a receiver, and a transponder activated when a signal is transmitted by the control center via the communications network to the receiver, and an auxiliary locating unit including a transmitter emitting a signal received by the primary locating unit receiver and relayed to the control center via the communications network by the primary locating unit transmitter. The typical communications network includes a plurality of VHF towers.

The subject invention also features an asset recovery method. A locating unit including a transmitter, a receiver, and a transponder is hidden in or on an asset. An auxiliary locating unit including at least a transmitter is associated with the same asset, with a different asset, or with an object or person. Upon receiving an auxiliary locating unit transmitter signal via the receiver of the locating unit, information regarding said signal is relayed to a control center.

The typical locating unit may further include a position determination subsystem and the locating unit transmitter transmits the position of the vehicle locating unit to the control center via the VHF towers. One position determination subsystem is a Global Positioning System unit. The control center may include a database of auxiliary locating units which are downloaded to the locating unit which is configured to relay a received auxiliary locating unit's signal to the control center if said signal matches an auxiliary locating unit stored in the database.

The locating unit may further include a cellular transceiver operable to activate the transponder based on a signal received from a cellular network. Then, the locating unit is further configured to relay to the control center via the cellular transceiver and the cellular network a signal emitted by an auxiliary locating unit.

The subject invention also features a recovery method comprising installing a primary locating unit including a transmitter, a receiver, and a transponder with a position determination subsystem for determining the position of the primary locating unit, associating with an asset, an object, or a person an auxiliary locating unit including at least a transmitter emitting a signal, and upon the primary locating unit receiving the signal emitted by the auxiliary locating unit, activating the transmitter of the primary locating unit to transmit a message indicating a detection of the auxiliary locating unit and the position of the primary locating unit.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
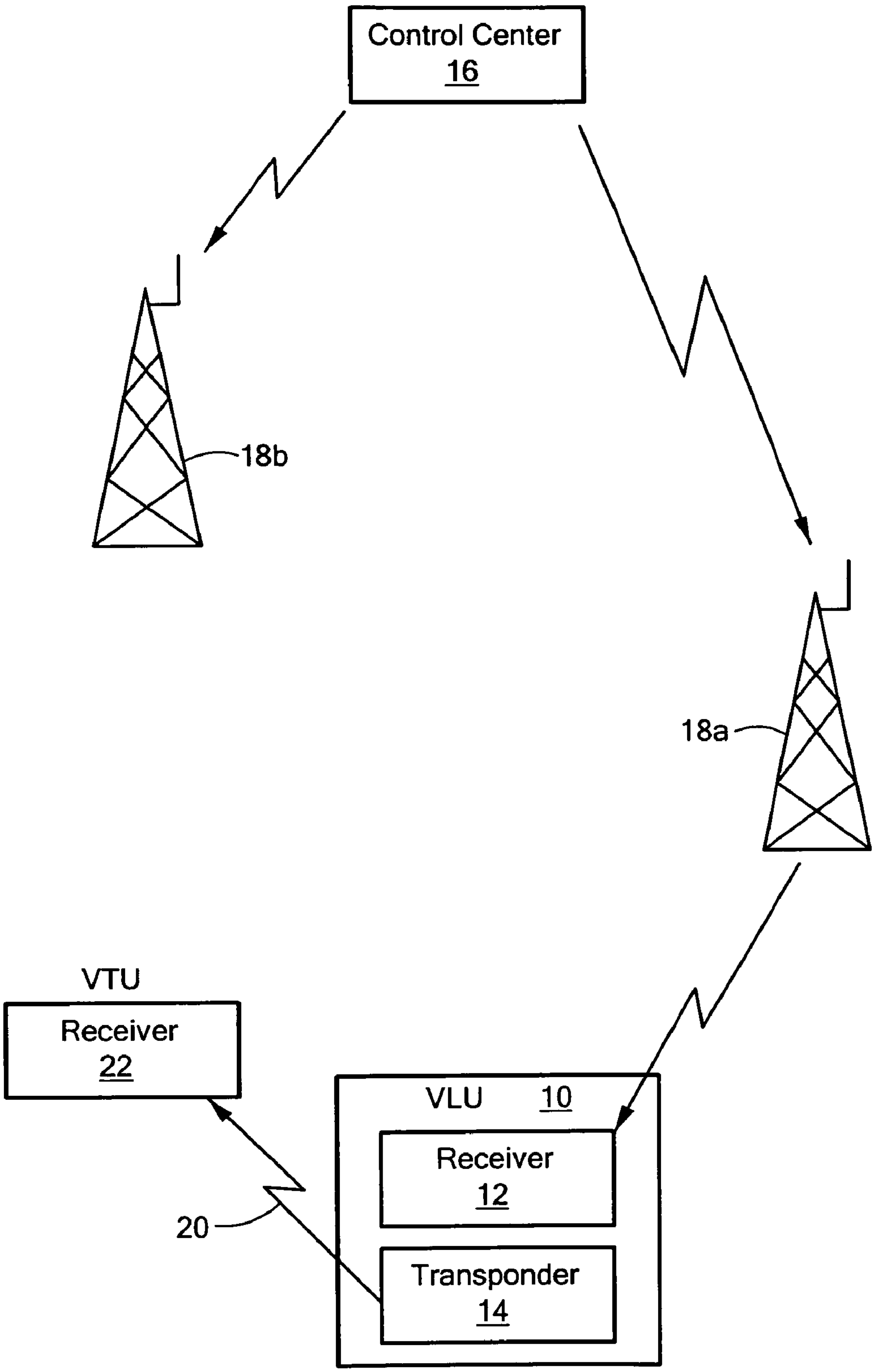
FIG. 1 is a schematic depiction of the applicant's existing LoJack® system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the background section above, the applicant's successful LoJack® system includes vehicle locating unit 10, FIG. 1 with receiver 12 and transponder 14 installed in a hidden location within a customer's vehicle. When the customer reports to the police or security company that his vehicle has been stolen, that information is forwarded to the LoJack Stolen Vehicle Database residing within the Police Control Center, or security company 16 which determines that the stolen vehicle is equipped with a vehicle locating unit. Control center 16 then forwards a signal via VHF tower network 18*a* and 18*b* which is ultimately received by receiver 12 of vehicle locating unit 10 in the customer's vehicle. The vehicle locating unit transponder 14, recognizing its unique code, is then activated based on this signal and the transponder signal 20 is detected by vehicle tracking unit 22 installed in a police vehicle so that the police can thus track and locate the stolen vehicle. Currently, many such vehicle locating units are in use. 173 MHz is the frequency currently used.

Figure 2:
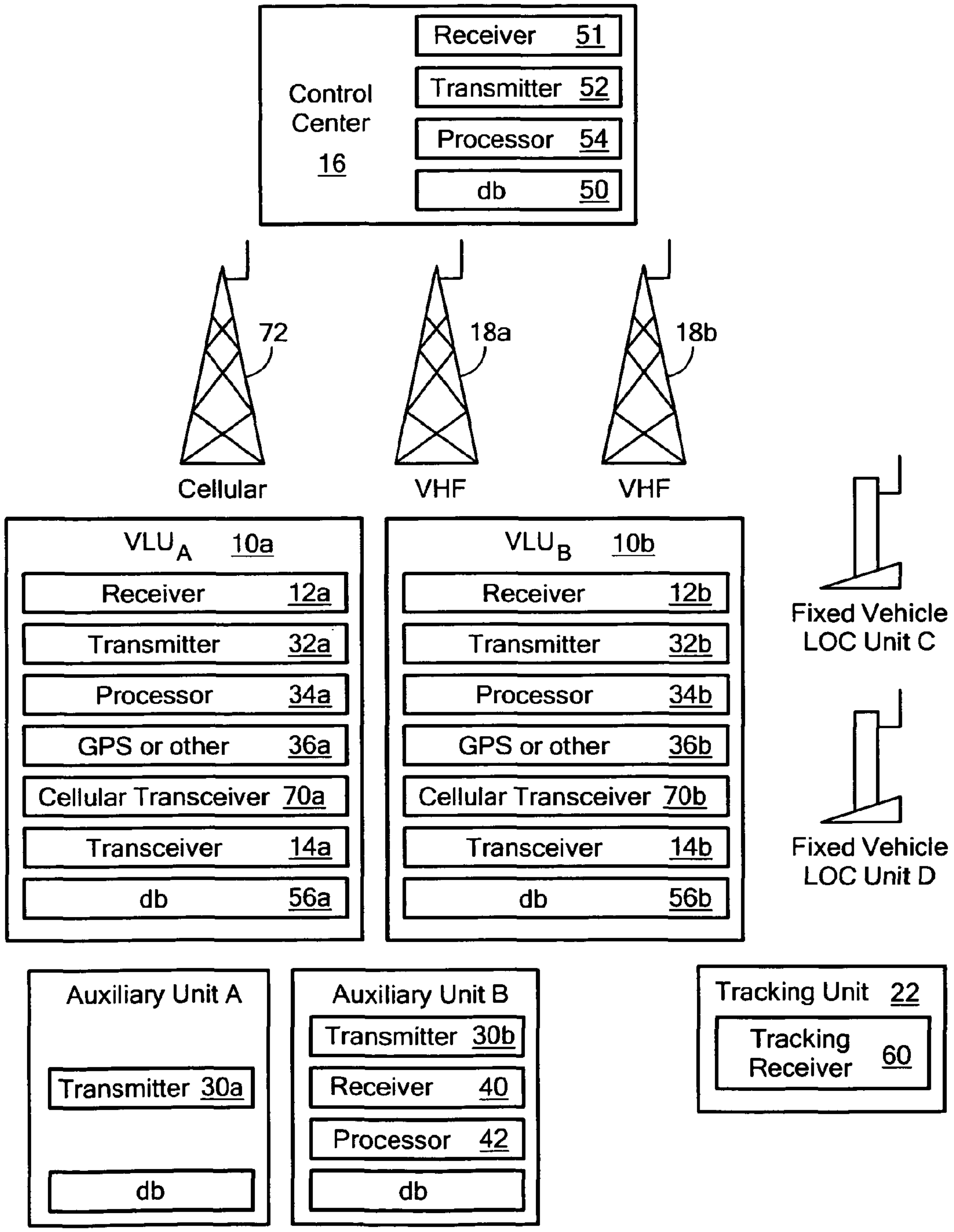
FIG. 2 is a schematic depiction showing the primary components associated with an enhanced LoJack® system in accordance with an example of the subject invention.

FIG. 2 discloses several novel enhancements to this system. The new system contemplates numerous auxiliary locating units such as auxiliary locating unit A and auxiliary locating unit B. Auxiliary locating unit A includes only a transmitter 30*a* which automatically emits a signal. Transmitter 30 may be battery powered or may derive its power from another power source. Battery power may be conserved by techniques such as those disclosed in U.S. Pat. No. 6,229,988, incorporated herein by this reference. Preferably, auxiliary transmitting unit A is very small, e.g., the size of a typical computer chip. Typically, auxiliary locating unit A is low cost. A customer, for example, can install auxiliary locating unit A in any object of interest, for instance, an all terrain vehicle, a snowmobile, bicycle, or the like. Unlicensed frequencies like 902 MHz may be used or the "LOJACK" frequency (173 MHz) may be used.

Vehicle locating units A and B (10*a* and 10*b*) are shown each with a receiver 12 and transponder 14 as discussed above. The units A and B may be further separated into two or more subcomponents. Each vehicle locating unit also includes transmitter 32 and at least minimal memory and processing capability 34. A transceiver may be used in place of receiver 12 and separate transmitter 32. Each vehicle locating unit transceiver 14*a*, 14*b* is typically activated as discussed above with reference to FIG. 1.

Now, however, receiver 12 of vehicle locating unit A and/or B, if within close proximity to auxiliary locating unit A, will receive the signal emitted by transmitter 30*a* of auxiliary locating unit A. An indicator that vehicle locating unit A, for example, has received auxiliary locating unit A's signal, can be sent by vehicle locating unit A transmitter 32*a* via VHF tower network 18 to receiver 51 of control center 16. If, in addition, vehicle locating unit A, or vehicle locating unit B includes a GPS receiver 36, or other means of location determination, including but not limited to location information from a cellular telephone network itself, the message sent by vehicle locating unit A, for example, can indicate that auxiliary unit A's signal was detected at a specific location based on data received by the GPS receiver or other means of location determination.

In this way, the LoJack VHF tower and vehicle locating unit network is utilized not only to track and locate vehicles equipped with vehicle locating units, but also vehicles and other objects of value or even people equipped only with an auxiliary unit.

Note that auxiliary locating unit B includes transmitter 30*b* in addition to receiver 40 and at least some minimal processing capability 42. In this way, suppose a vehicle or object with such an auxiliary locating unit is reported stolen. That information is loaded into database 50 of control center 16. Transmitter 52, under the control of processor 54, sends a signal via VHF tower network 18 which is received by the receivers of vehicle locating units A and B which then store in their databases 56*a* and 56*b* the identity of auxiliary locating unit B. Either or both vehicle locating units A and B then begin transmitting a signal via their transmitters 32*a* and 32*b* under the control of processors 34*a* and 34*b* which is received by receiver 40 of auxiliary locating unit B and used by processor 42 thereof to activate transmitter 30*b* or to cause transmitter 30*b* to transmit at a different rate, or the like, with the purpose of causing the auxiliary locating unit B easier to track by tracking unit 22 with receiver 60. Also, if either vehicle locating unit A (or vehicle locating unit B) receive auxiliary locating unit B's signal, it is matched with the data stored in database 56*a* (or 56*b*), is noted to be a stolen auxiliary locating unit, and the fact that auxiliary locating unit B's signal was detected can be relayed to control center 16' via Vehicle Units And B transmitters 32*a* and 32*b*, Position information from GPS unit 36*a* can also be included, thereby providing Police or private security the general location to dispatch Tracking Unit 22. Police or private tracking unit 22 may also receive auxiliary tracking unit B's signal directly or from either Vehicle Locating Unit A or B. Optionally, a number of additional Vehicle Locating units C and D may be deployed in fixed locations and may also receive, process and forward auxiliary location unit B's signal.

Thus, tracking unit 22 with receiver 60 can be used to track and/or locate auxiliary locating unit A and/or auxiliary locating unit B in addition to tracking vehicle locating unit A and/or vehicle locating unit B.

And, all vehicle locating units can function as tracking units for the auxiliary locating units. Since there are numerous vehicles equipped with vehicle locating units, the ability to use the vehicle locating units in this way to receive signals from auxiliary locating units is realized. Also, vehicle locating units can communicate with each other, as can auxiliary vehicle locating units configured in the same way as auxiliary locating unit B, FIG. 2. The result is a kind of mesh network including VHF towers 18*a* and 18*b*, vehicle locating units 10*a* and 10*b*, and auxiliary units A and B.

In still another embodiment, vehicle locating units A and B are equipped with cellular transceivers 70*a* and 70*b* providing an additional communication channel via a cellular tower or any other network, such as but not limited to bidirectional paging, microwave, WiFi, or the like, between control center 16 and the vehicle locating units. And, cellular transceivers 70*a* and 70*b* can be used to provide position information supplemental to or instead of GPS units 36*a* and 36*b* using Timed Difference of Arrival (TDOA) or other techniques. Other communication channels are possible as are other means of detecting position. It is contemplated that auxiliary units A and B will preferably transmit at a VHF frequency but other frequencies including allocated RFID frequencies are possible.

Also, a single vehicle can be equipped with a vehicle locating unit and one or more auxiliary locating units. Suppose a single vehicle is equipped with vehicle locating unit A and auxiliary locating unit A. Vehicle locating unit A monitors the signal emitted by auxiliary locating unit A's transmitter 30*a* and, if that signal is not received, a message is sent by Vehicle locating unit A to control center 16'. In another scenario, suppose a single vehicle is equipped with vehicle locating unit B and auxiliary locating unit B. Now vehicle locating unit B and auxiliary locating unit B can be configured to communicate with each other. Auxiliary locating unit B may monitor a signal emitted periodically by transmitter 32*b* of vehicle locating unit B. If that signal is not received, auxiliary locating unit B's transmitter 30*b* is activated. Vehicle locating unit A and/or tracking unit 22 detect this signal and relay it to the control center as an indication that vehicle locating unit B is faulty and/or damaged.

The result, in any embodiment, is the ability to offer several enhancements to the basic LoJack® system which are relatively easy to implement at a low cost providing reliable tracking and location services of only moderate complexity. In other embodiments, tracking and locating systems other than the applicant's successful LoJack® System can be enhanced in accordance with the subject invention.

As but one example, control center 16', FIG. 2 includes in database 50 managed by processor 54 including a listing of various auxiliary locating units which have been the subject of a theft event. The contents of this database are relayed via a regional or national VHF network 18*a*, 18*b* and/or cellular network 72 to all the vehicle locating units which then store this information in their internal databases. In the example shown in FIG. 2, vehicle locating unit A receives this information via receiver 12*a* and, under the control of processor 34*a*, stores the stolen auxiliary locating unit data in database 56*a*. Vehicle locating unit B operates similarly. Any time a vehicle locating unit then receives a signal from an auxiliary locating unit whose identity corresponds to the identity of a stolen auxiliary locating unit included in the listing of database 56, that vehicle locating unit can begin transmitting a signal via its transmitter 32 relayed back to control center 16 via the VHF network 18 and/or the cellular network 72. Other vehicle locating units may similarly send a signal to control center 16 indicating that vehicle locating unit A has detected the presence of a stolen auxiliary locating unit. When a vehicle locating unit is equipped with GPS or another position determination subsystem, that information can be also relayed to control center 16.

Stated another way, control center 16 effectively provides a list of units in all items missing and stolen to all of the vehicle locating units it is able to reach as to whether a particular auxiliary locating unit's signal has been detected and any vehicle locating unit which has detected that auxiliary locating unit's unique signal provides a response back to the control center.

In still another embodiment, a vehicle is provided with a plurality of auxiliary units which periodically emit a signal each at a different frequency. One reason for such a scenario is to increase the possibility of finding stolen vehicles by making it more difficult for thieves to locate and remove these auxiliary units hidden in a vehicle. A central, on-board vehicle locating unit is placed in this vehicle and is in real time communication with control center 16. A number of auxiliary units are placed at various locations within the vehicle. The vehicle locating unit is programmed with the number of auxiliary units and each auxiliary unit's unique identifier. The auxiliary units may have both a common identifier and a specific identifier for quality control (similar to a family name and a first name). Tracking can be accomplished with the common identifier, and identification of a defective unit can be detected using the specific identifier.

The auxiliary units, in order to conserve power, emit periodically a very short and low power signal that is monitored by the vehicle locating unit. An acknowledgement signal is then sent from the vehicle locating unit to each auxiliary unit to confirm its presence. If the vehicle locating unit determines a stolen condition, or does not respond to the query from the auxiliary units, then the auxiliary units are programmed (see processor 42 of auxiliary unit B, FIG. 2) to wake up and emit a stronger signal. In this way, the auxiliary units are slaves to the vehicle locating unit.

Such a method makes it even harder for thieves to locate the auxiliary units since they are not constantly emitting at a higher power. Furthermore, it also permits the vehicle locating unit to track the auxiliary locating units within the vehicle. For example, if an auxiliary unit has not checked in within a prescribed time period with the vehicle locating unit, then the vehicle locating unit can send a message to control center 16' to that effect. This would permit replacement of a defective auxiliary unit. For example, if a vehicle has an auxiliary unit placed in a bumper and the vehicle is involved in an accident requiring replacement of the bumper, then the vehicle locating unit can determine this condition and the vehicle can be brought in for service in order to reprogram the vehicle locating unit or replace the missing auxiliary unit.

These auxiliary units can also become a component of a kinetic or mesh network where each vehicle locating unit equipped customer would be able to listen to an auxiliary unit that has been identified as stolen.

In another scenario, if a vehicle locating unit is damaged or removed from a vehicle in a theft, the auxiliary units still inside the vehicle can be programmed, now that they have not received a signal from the vehicle locating unit, to change their behavior and increase their signal transmission frequency and output power to be detected by other vehicle locating units or police based tracking units in the vicinity of the stolen vehicle. A daisy chain effect could be used inside the vehicle if multiple auxiliary units are used in the same vehicle so battery power could be maximized.

With the network of vehicle locating units themselves networked with a control center via the VHF tower network (and/or another communications channel), the advent of small, inexpensive auxiliary locating units detectable by the vehicle locating units results in a system useful for many purposes in which can be implemented in a number of ways. Personal valuables, children, bicycles, pets, construction equipment, supplies, tools, elderly people and/or people with Alzheimer's disease, weapons, all terrain vehicles, dirt bikes, boats, criminals, hunters, climbers and other outdoor enthusiasts, cash, military personnel, hospital equipment, aircraft and other "objects" can be located and tracked. Also, a "vehicle" locating unit need not necessarily be installed in a vehicle. Such a unit can be installed as a "listening post" in a house or other structure. Indeed, such a "primary" locating unit in a building can be linked to a conventional home security system as a means of transmitting messages indicating a security breach. Also, a primary locating unit can be used as a link between primary locating units of different legacy networks.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An asset location, tracking, and recovery system comprising:

a network of VHF towers;

a control center receiving signals from and transmitting signals to the VHF towers;

a locating unit including a transmitter, a receiver, and a transponder activated when a signal is transmitted by the control center via the VHF towers to the receiver; and at least one auxiliary locating unit including at least a transmitter emitting a signal received by the locating unit receiver and relayed to the control center via the VHF towers from the locating unit transmitter.

2. The system of claim 1 in which the locating unit further includes a position determination subsystem for transmitting via the locating unit transmitter the position of the vehicle locating unit to the control center via the VHF towers.

3. The system of claim 2 in which the position determination subsystem includes a global positioning system unit.

4. The system of claim 1 in which the control center includes a database of auxiliary locating units reported stolen, missing, lost, or in need of finding, downloaded to the locating unit which is configured to relay a received auxiliary locating unit signal to the control center only if said signal matches an auxiliary locating unit stored in the database.

5. The system of claim 1 in which the vehicle locating unit further includes a cellular transceiver operable to activate the transponder based on a signal received from a cellular network.

6. The system of claim 5 in which the locating unit is further configured to relay to the control center via the cellular transceiver and the cellular network a signal emitted by an auxiliary locating unit.

7. The system of claim 1 in which the auxiliary locating unit and the locating unit are installed in one vehicle.

8. The system of claim 7 in which the locating unit is configured to transmit a message to the control center when the auxiliary locating unit fails to emit a signal.

9. The system of claim 7 in which the auxiliary locating unit includes a receiver, the locating unit transmits a signal to the auxiliary locating unit receiver, and the auxiliary locating unit is configured to emit a signal if the locating unit fails to transmit its signal.

10. The system of claim 1 in which the auxiliary locating unit is installed in a first vehicle and the vehicle locating unit is installed in a different, second vehicle.

11. The system of claim 1 in which the auxiliary locating unit further includes a receiver for receiving signals from the locating unit transmitter and/or from the control center via the VHF tower network.

12. The system of claim 1 in which the auxiliary locating unit further includes a receiver and is configured to emit a signal only when a signal is received by the receiver.

13. The system of claim 1 in which the control center is configured to query the vehicle locating unit regarding whether it has received an auxiliary locating unit signal.

14. An asset recovery system comprising:

a communications network;

a control center receiving signals from and transmitting signals to the communications network;

a primary locating unit including a transmitter, a receiver, and a transponder activated when a signal is transmitted by the control center via the communications network to the receiver; and an auxiliary locating unit including a transmitter emitting a signal received by the primary locating unit receiver and relayed to the control center via the communications network by the primary locating unit transmitter.

15. The system of claim 14 in which the communications network includes a plurality of VHF towers.

16. An asset recovery method comprising:

hiding a locating unit including a transmitter, a receiver, and a transponder in an asset;

communicating with the locating unit receiver to activate the transponder;

associating an auxiliary locating unit including at least a transmitter with the same asset, with a different asset, or with an object or person; and upon receiving an auxiliary locating unit transmitter signal via the receiver of the locating unit, relaying information regarding said signal to a control center.

17. The method of claim 16 in which the locating unit further includes a position determination subsystem and the locating unit transmitter transmits the position of the vehicle locating unit to the control center via the VHF towers.

18. The method of claim 17 in which the position determination subsystem includes a Global Positioning System unit.

19. The method of claim 16 in which the control center includes a database of auxiliary locating units which are downloaded to the locating unit which is configured to relay a received auxiliary locating unit's signal to the control center if said signal matches an auxiliary locating unit stored in the database.

20. The method of claim 16 in which the locating unit further includes a cellular transceiver operable to activate the transponder based on a signal received from a cellular network.

21. The method of claim 20 in which the locating unit is further configured to relay to the control center via the cellular transceiver and the cellular network a signal emitted by an auxiliary locating unit.

22. The method of claim 20 in which the auxiliary locating unit and the locating unit are installed in one vehicle.

23. The method of claim 22 in which the locating unit is configured to transmit a message to the control center when the auxiliary locating unit fails to emit a signal.

24. The method of claim 22 in which the auxiliary tracking unit includes a receiver, the locating unit transmits a signal to the auxiliary locating unit receiver and the auxiliary locating unit is configured to emit a signal if the locating unit fails to transmit its signal.

25. The method of claim 16 in which the auxiliary locating unit is installed in a first vehicle and the vehicle locating unit is installed in a different, second vehicle.

26. The method of claim 16 in which the auxiliary locating unit further includes a receiver for receiving signals from the vehicle locating unit transmitter and/or from the control center via the VHF tower network.

27. The method of claim 16 in which the auxiliary locating unit further includes a receiver and is configured to emit a signal when a signal is received by the receiver.

28. The method of claim 16 in which the control center queries the locating unit regarding whether it has received an auxiliary locating unit signal.

29. A recovery method comprising:

installing a primary locating unit including a transmitter, a receiver, and a transponder with a position determination subsystem for determining the position of the primary locating unit;

associating with an asset, an object, or a person an auxiliary locating unit including at least a transmitter emitting a signal; and upon the primary locating unit receiving the signal emitted by the auxiliary locating unit, activating the transmitter of the primary locating unit to transmit a message indicating a detection of the auxiliary locating unit and the position of the primary locating unit.

* * * * *